(12) United States Patent
Sugawara et al.

(10) Patent No.: US 6,801,391 B2
(45) Date of Patent: Oct. 5, 2004

(54) MAGNETIC HEAD WITH FERRITE BETWEEN NONMAGNETIC PORTIONS AND A NONMAGNETIC GAP

(75) Inventors: Akira Sugawara, Miyagi (JP); Naoyuki Kaneyama, Miyagi (JP); Akihiro Konno, Miyagi (JP)

(73) Assignee: Sony Corporation, Tokyo (JP)

( * ) Notice: Subject to any disclaimer, the term of this patent is extended or adjusted under 35 U.S.C. 154(b) by 108 days.

(21) Appl. No.: 10/119,472

(22) Filed: Apr. 10, 2002

(65) Prior Publication Data

US 2002/0159190 A1 Oct. 31, 2002

(30) Foreign Application Priority Data

Apr. 13, 2001 (JP) ..................................... P2001-114969

(51) Int. Cl.[7] ............................................. G11B 5/127
(52) U.S. Cl. ...................................................... 360/125
(58) Field of Search ................................ 360/125, 122

(56) References Cited

U.S. PATENT DOCUMENTS 4,602,307 A * 7/1986 Toriu et al. ................. 360/125
4,821,134 A * 4/1989 Niwa .......................... 360/122
5,256,606 A * 10/1993 Maki ............................ 501/60

* cited by examiner

Primary Examiner—A. Jo Heinz
(74) Attorney, Agent, or Firm—Sonnenschein, Nath & Rosenthal LLP (57) ABSTRACT

There is provided a magnetic head formed with a pair of magnetic core halves fitted to abut on each other having a nonmagnetic gap therebetween and having a slide contact plane for slide contact with a magnetic recording medium on which an end face of the nonmagnetic gap and the magnetic core halves. In the magnetic head, a nonmagnetic portion formed by filling a glass material is provided at an end portion of the slide contact plane outer than the end face of the magnetic core halves on the slide contact plane. The inventive magnetic head realizes less volume of magnetic body while solving problems in mechanical strength of the magnetic head or in compatibility to a conventional head. Accordingly, a magnetic head with excellent head performance without decreasing productivity can be obtained.

9 Claims, 6 Drawing Sheets

MAGNETIC HEAD WITH FERRITE BETWEEN NONMAGNETIC PORTIONS AND A NONMAGNETIC GAP

CROSS REFERENCES TO RELATED APPLICATIONS

The present document is based on Japanese Priority Document JP 2001-114969, filed in the Japanese Patent Office on Apr. 13, 2001, the entire contents of which being incorporated herein by reference.

BACKGROUND OF THE INVENTION

1. Field of the Invention

The present invention relates to a magnetic head used for a magnetic tape, one of a magnetic recording medium, in a video tape recorder (VTR), for example, and a method of manufacturing the magnetic head.

2. Description of the Related Art

Along with development in digitalization in recent years, higher recording density is required in a field of magnetic recording. With regard to a magnetic head using a magnetic tape as a recording medium, those excellent in recording/reproducing performance (hereinafter, simply referred to as "head performance") in its frequency bandwidth to be used are expected. As a magnetic head suitable for realizing such a high recording density, a thin film magnetic head such as a magneto-resistive (MR) head and a bulk-type Metal-In-Gap (MIG) head have been suggested. Among these, in view of reduction in product cost, the bulk-type MIG head is widely employed.

Figure 9A:
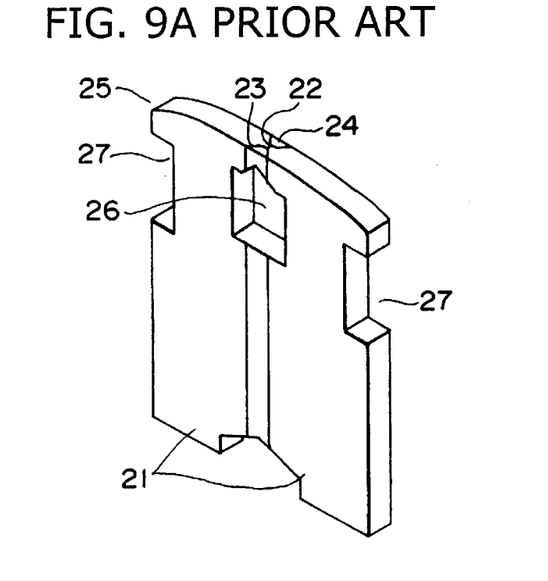
FIG. 9A is a perspective view.
Figure 9B:
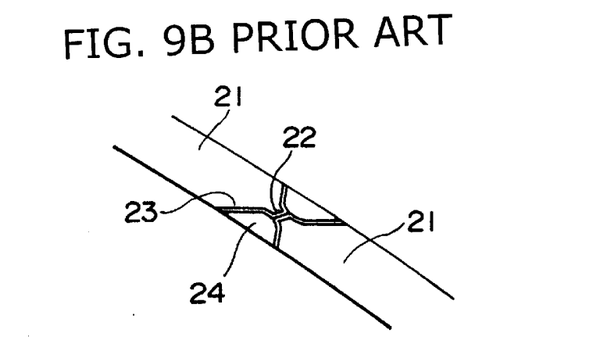
FIG. 9B is a partially enlarged view.

The bulk-type MIG head is formed with, as shown in FIGS. 9A and 9B, a pair of magnetic core halves 21, each comprising a magnetic material, such as ferrite, fitted to abut on each other. A portion where the magnetic core halves 21 abut on each other functions as a magnetic gap 22. A metal magnetic film 23 comprising a ferromagnetic material, such as Sendust, is arranged only in the vicinity of the magnetic gap 22. This arrangement improves the head performance. The magnetic core halves 21 are bonded to each other with low melting glass 24 to be a single body.

Figure 10:
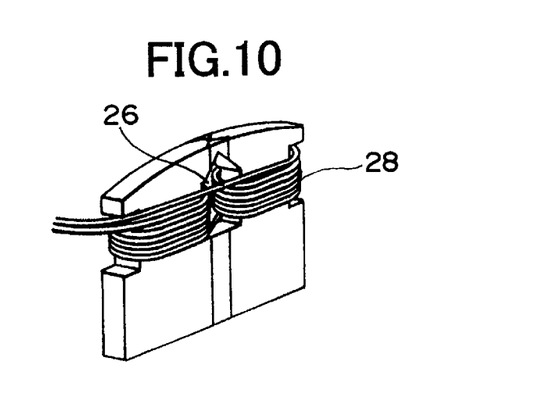
FIG. 10 is a perspective view showing a specific example of the magnetic head with a coil wire wound around it.

For slide contact with a magnetic tape, the MIG head has a slide contact plane 25 formed to be substantially arc. One end of the magnetic gap 22, the metal magnetic thin film 23 arranged in the vicinity of the magnetic gap 22 and the pair of magnetic core halves 21 for sandwiching them is exposed on the slide contact plane 25. In addition, the MIG head has a winding opening 26 positioned substantially at the center of the pair of the magnetic core halves 21 and a coil guide notch 27 provided at an edge of each of the magnetic core halves 21. As illustrated in FIG. 10, a coil wire 28 is wound along a direction substantially parallel to the slide contact plane 25 utilizing the winding opening 26 and the coil guide notches 28.

As described above, the magnetic heads including the MIG head are expected to have excellent head performance. It is considered that improvement of the head performance can be realized by, for example, optimizing the property (such as soft magnetic property), the structure (such as plural laminated films) or the film-forming conditions (such as angle of incidence, direction of easy magnetizable axis) of the metal magnetic thin film 23 for attaining higher permissivity and higher saturation density at the magnetic core in the vicinity of the magnetic gap 22, or by adjusting a crystal direction of the magnetic core halves 21 for reducing noise signals. However, a number of factors affect each other in optimization of the metal magnetic thin film 23 and the crystal direction, a variety of studies are required in a process from development to practical application, that is, it takes quite a long time until the practical application. Accordingly, the above-mentioned ways are not always appropriate from a point of view of earlier practical application and lower production cost.

Alternately, there is another way for solving difficulties in the earlier practical application and the promotion of reduction in production cost that, for example, the number of winding of the coil wire 28 is increased so as to improve the head performance. The more the number of winding of the coil wire 28 increases, the more the recording/reproducing performance of the magnetic head is improved. However, if the number of winding of the coil wire 28 is simply increased, inductance L thereof becomes greater. This may possibly make the value of the inductance L beyond a range of its standard values (rated values).

If a volume of the magnetic core formed with the pair of magnetic core halves 21, that is the volume of the magnetic body, is reduced, increase of the inductance L is suppressed. Thus, it is possible to avoid such a disadvantage described above. However, when the reduction in volume of the magnetic body makes the outside dimension (thickness, width or the like) of the magnetic head smaller, there arise problems that mechanical strength of the magnetism core itself drops, that specification change of a drum on which the magnetic head is mounted is required, and that an area of the slide contact plane necessary for slide contact with the magnetic tape cannot be easily ensured.

In view of the problems as described above, as disclosed in Japanese Patent Application Publication Hei 6-274816, a magnetic head which has a magnetic core with a smaller volume without changing the outer shape of the magnetic head and without deteriorating mechanical strength thereof by forming the magnetic core with a bonded body comprising a magnetic ferrite and a nonmagnetic ferrite laminated thereon. According to the disclosed magnetic head, since it is possible to reduce volume of the magnetic core, increase of the inductance L is suppressed even if the number of winding the coil wire is increased. As a result, it is possible to improve the head performance while solving the problems in mechanical strength and compatibility to the conventional products.

However, in the magnetic head using the magnetic core, since the bonded body in which the nonmagnetic ferrite is laminated on the magnetic ferrite is used, a complicated bonding step in which pressurization at a high temperature (hot press) of 1000° C. or more, for example, is carried out on the magnetic ferrite and the nonmagnetic ferrite is required in addition to usual head forming steps. This makes the productivity largely drop. This may make it unfavorable in promotion of reducing production cost. In addition, since the magnetic core has a two-layer structure comprising the magnetic ferrite and the nonmagnetic ferrite laminated thereon, there is less flexibility in shaping the magnetic core and the magnetic ferrite and the nonmagnetic ferrite cannot be always arranged at appropriate positions. Furthermore, difference in thermal expansion coefficients between the magnetic ferrite and the nonmagnetic ferrite, the bonded body may have distortion or other problems.

SUMMARY OF THE INVENTION

In the present invention, a portion that does not contribute much to improvement of the head performance on a magnetic circuit basis among structural parts of a magnetic head has been focused. According to the present invention, while problems in mechanical strength of the magnetic head and compatibility with a conventional product are solved, volume of the magnetic body is decreased. This realizes a magnetic head having excellent head performance, which does not reduce production efficiency nor introduce lack of flexibility in forming a magnetic core.

The magnetic head according to the present invention is formed to have a nonmagnetic gap positioned between a pair of magnetic core halves and to have a slide contact plane for slide contact with a magnetic recording medium, formed by exposing one end face of the nonmagnetic gap and the magnetic core halves. In the magnetic head, a nonmagnetic portion filled with a glass material is provided at an outer end of the slide contact plane than the one end face of the magnetic core halves on the slide contact plane.

The present invention also provides a manufacturing method of the magnetic head. According to the present invention, there is provided a manufacturing method of a magnetic head formed to have a nonmagnetic gap positioned between a pair of magnetic core halves and to have a slide contact plane for slide contact with a magnetic recording medium, formed by exposing one end face of the nonmagnetic gap and the magnetic core halves. In the magnetic head, a groove is provided at an end portion of the slide contact plane outer than the one end face of the magnetic core halves on the slide contact plane, into which a glass material is filled to have a nonmagnetic portion.

According to the magnetic head having the above construction and the manufacturing method of the magnetic head including the above procedure, the nonmagnetic portion is provided at the end portion of the slide contact plane outer than the one end face of the magnetic core halves on the slide contact plane, in other word, a portion that does not contribute to improvement of head performance in terms of a magnetic circuit. This makes it possible to reduce volume of the magnetic core halves without changing its outer shape and without reducing mechanical strength. Accordingly, it is possible to improve recording/reproducing performance of the magnetic head by increasing the number of turns of a coil wire while suppressing increase of the inductance L thereof. In addition, since the nonmagnetic portion is formed with the glass material, it is possible to have the nonmagnetic portion by filling a molten glass material into an arbitrarily shaped groove, for example.

As described above, according to the magnetic head and the manufacturing method of the magnetic head of the present invention, the portion that does not contribute much to improvement of the head performance, in terms of a magnetic circuit, among structural parts of the magnetic head has been focused. The utilization of the portion enables solution of the problems in mechanical strength of the magnetic head, in compatibility with a conventional magnetic head or the like, and, further, realizes reduction in volume of the magnetic body. Thus, the present invention makes it possible to realize excellent recording/reproducing performance of the magnetic head (head performance) and to sufficiently deal with higher recording density needed in recent years. Besides, the present invention does not reduce production efficiency of the magnetic head nor introduce lack of flexibility in forming the magnetic core. Thus, the present invention does not largely increase production cost.

BRIEF DESCRIPTION OF THE DRAWINGS

The above and other objects, features and advantages of the present invention will become more apparent from the following description of the presently preferred exemplary embodiments of the invention taken in conjunction with the accompanying drawings, in which:

FIGS. 2A to 2C are schematic perspective views showing steps of an example of a manufacturing method according to the present invention, in which

FIGS. 9A and 9B are schematic views showing an example of a conventional magnetic head, in which

DESCRIPTION OF THE PREFERRED EMBODIMENTS

Referring now to the attached drawings, a magnetic head and a manufacturing method of the magnetic head according to the present invention will be explained. In the description, a case where the present invention is applied in a bulk-type MIG head is taken as an example.

Figure 1:
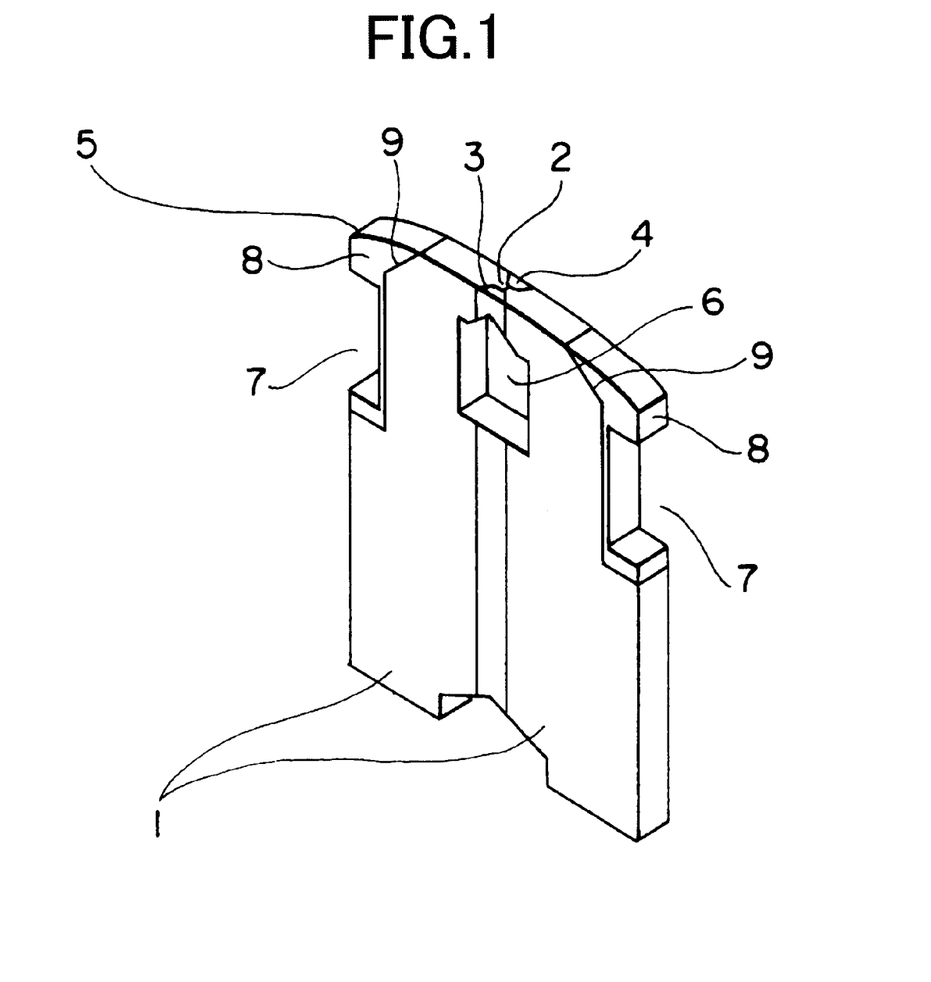
FIG. 1 is a schematic perspective view showing an example of a magnetic head according to the present invention.
Figure 6:
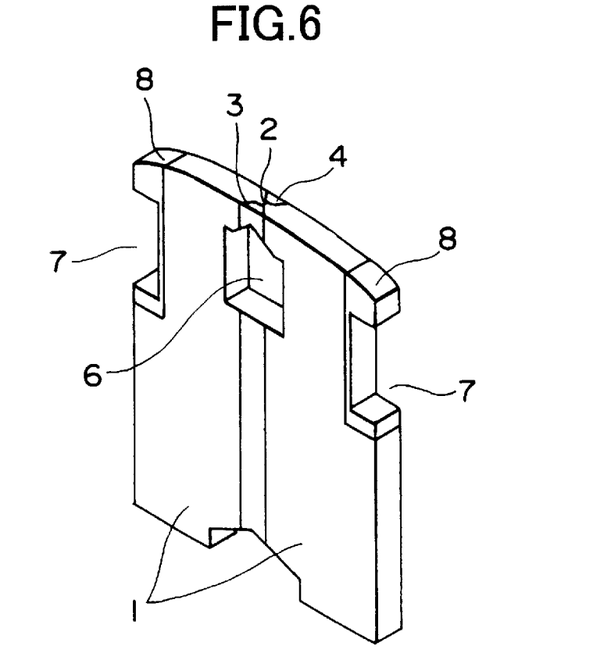
FIG. 6 is a schematic perspective view showing another example of the magnetic head according to the present invention.

The MIG head explained herein is formed with a pair of magnetic core halves 1 comprising a magnetic material such as ferrite abutting on each other, as shown in FIG. 1, substantially similar to a conventional MIG head as shown in FIG. 6. The portion where the pair of magnetic core halves 1 abut on each other functions as a magnetic gap 2. Only in the vicinity of the magnetic gap 2, a metal magnetic thin film 3 comprising a ferromagnetic material such as Sendust is positioned on purpose to improve head performance of the magnetic head. The pair of magnetic core halves 1 are bonded integrally with low melting glass 4.

The MIG head has a slide contact plane 5 formed to be substantially an arc for slide contact with a magnetic tape being a magnetic recording medium. On a surface of the slide contact plane 5, an end of the magnetic gap 2; the metal magnetic thin film 3 in the vicinity of the magnetic gap 2; and the pair of magnetic core halves 1 sandwiching them is exposed. The MIG head further has a winding opening 6 positioned substantially at the center of the pair of the magnetic core halves 1 and a pair of coil guide notches 7 positioned at both edges of the bonded magnetic core halves 1. Using the winding opening 6 and the coil guide notches 7, the coil wire is wound along a direction substantially parallel to the slide contact plane 5 (See FIG. 10).

However, the MIG head in the description, which is different from a conventional one, a pair of nonmagnetic portions 8 formed by filling a glass material at both end portions of the slide contact plane 5 outer than the end face of the magnetic core halves 1 on the slide contact plane 5.

Each of the nonmagnetic portions 8 is arranged to extend to the edge of slide contact plane 5. Furthermore, each of the nonmagnetic portions 8 is arranged to have a depth in a direction substantially orthogonal to the slide contact plane 5 extending to a position lower than a bottom end of the coil guide notch 7. In other words, each of the nonmagnetic portions 8 extends in its depth to the bottom end of the coil guide notch 7.

A boundary plane of the nonmagnetic portions 8 and the magnetic core halves 1 in the vicinity of the slide contact plane 5 is chamfered on the side of the magnetic core halves 1. According to this arrangement, the nonmagnetic portion 8 has a slope 9 having a non-right angle (substantially 45°) relative to the slide contact plane 5 on the side of the magnetic gap 2. In other words, the nonmagnetic portion 8 has the slope 9 non-parallel to a gap abutting plane provided on each of the magnetic core halves 1 so as to bond the magnetic core halves 1.

Figures 2A, 2B:
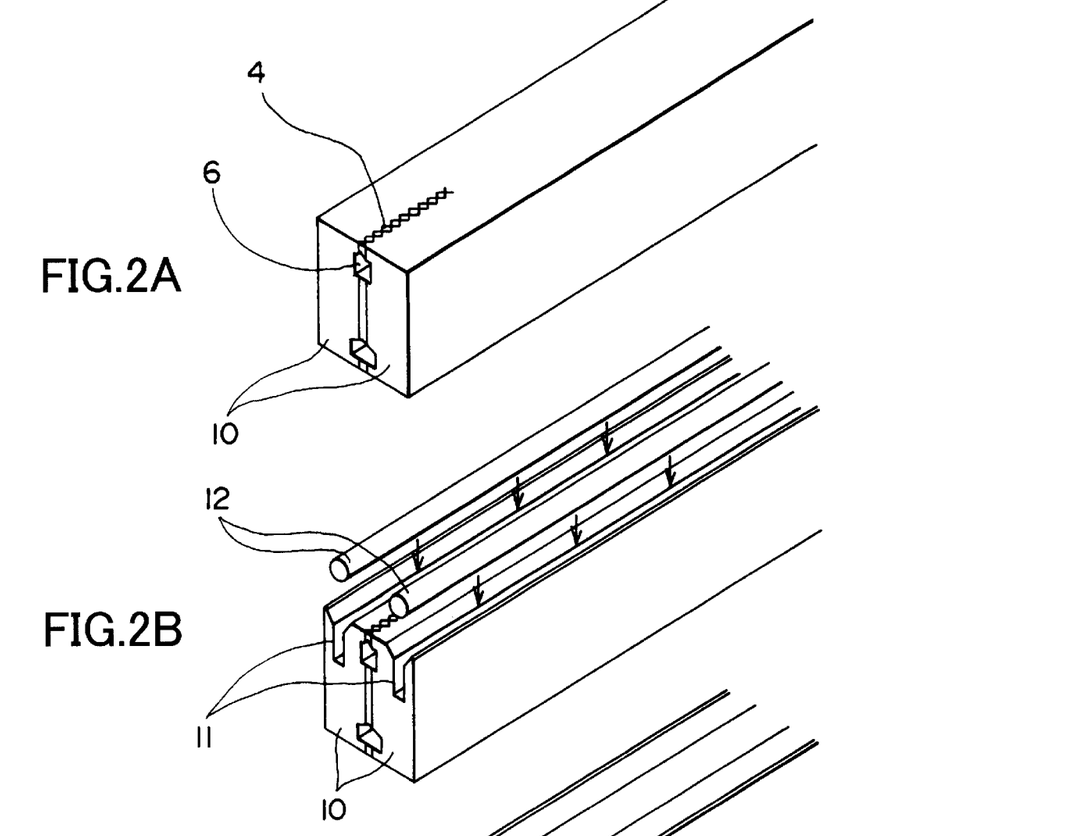
FIG. 2A shows a state after a pair of magnetic core half blocks are bonded.
FIG. 2B shows a state of forming a groove and filling a glass material into the groove.

The MIG head having a construction mentioned above can be manufactured in accordance with the following steps. First, as shown in FIG. 2A, a pair of magnetic core half blocks 10 having a group of track width regulating grooves formed over a surface thereof and the metal magnetic thin film 3 sputtered on the group of track width regulating grooves are fitted to abut on each other having the metal magnetic thin film 3 sandwiched therebetween. The magnetic core half blocks 10, which comprise a magnetic material such as ferrite, are sliced to have each piece of the magnetic core halves 1 in a later step. The low melting glass 4 is filled in the group of track width regulating grooves so that the pair of magnetic core half blocks 10 are bonded to each other. In this case, each of the magnetic core half blocks 10 already has the winding opening 6 formed therein.

After bonding the magnetic core half blocks 10 to each other, as shown in FIG. 2B, a pair of grooves are formed over a surface of the bonded blocks in a longitudinal direction of the bonded blocks. The surface over which the grooves are formed is a surface on which the slide contact plane 5 is formed in a later step. In this description, the corresponding surface is referred to as a "target surface". A position where each of the grooves is formed is between the metal magnetic thin film 3 and an edge of the target surface. An end face of each of the magnetic core half block 10 exists between the metal magnetic thin film 3 and the groove. According to the arrangement, on the target surface, a groove 11 is formed at each of two positions at end portions outer than each end face of the magnetic core half blocks 10.

Each of the grooves 11 may be formed by cutting process on the magnetic core half blocks 10, for example. However, it is preferable that a wall of each groove 11 is finished to have a surface roughness Ra of 50 nm or less due to a reason described later. As an example of means to finish the surface to have a surface roughness Ra of 50 nm or less, a resin type diamond grindstone having a average particle size of abrasive grains being 10–15 μm, for example, may be used for grinding. As for the width and the depth of the groove 11 may be determined appropriately in accordance with the outer shape of the MIG head in consideration of the position of the coil guide notches 7 formed at a later step.

After forming the groove 11, a glass material 12 in a molten condition is filled in the groove 11. In this case, the glass material 12 to be filled in the groove 11 preferably has the same composition as the low melting glass 4 filled in the track width regulating grooves for bonding the pair of magnetic core half blocks 10, due to a reason described later. However, a glass material having another composition may be used as far as the glass material is nonmagnetic and can be filled in the groove 11.

Figure 2C:
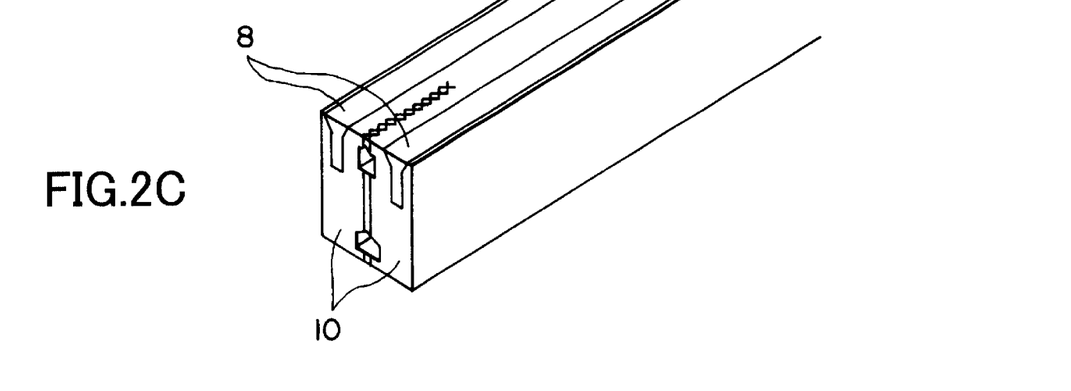
FIG. 2C shows a state after filling of the glass material.

By filling the glass material 12, the nonmagnetic portion 8 is formed in each of the grooves 11, as shown in FIG. 2C. After formation of the nonmagnetic portion 8, a pair of coil guide notches 7 are formed on both side of the bonded magnetic core half blocks 10 and a surface of the bonded blocks on which the nonmagnetic portions 8 are exposed is roughly cut to be an arc. After slicing the bonded blocks to have each head separated, the roughly cut surface is finished to form the slide contact plane 5. Thereafter, the coil wire is wound utilizing the winding opening 6 and the coil guide notches 7. In this way, the MIG head having the above-described construction is completed.

According to the MIG head and the manufacturing method of the MIG head explained in the present embodiment, the nonmagnetic portion 8 is provided at the end portion of the slide contact plane 5 outer than the one end face of each of the magnetic core halves 1 on the slide contact plane 5, that is, a portion in the vicinity of an outer periphery of the head, which does not contribute much to improvement of the head performance in the magnetic circuit. Therefore, volume of the magnetic core (magnetic body) can be reduced without reducing mechanical strength of the whole magnetic head, without need to change in the specification of a drum on which the MIG head is mounted, and without introducing difficulty in securing a necessary area of the slide contact plane with a magnetic tape. Besides, since the nonmagnetic portion 8 comprises a glass material, which does not affect on the magnetic characteristics, there is no influence on the inductance L. Accordingly, it becomes possible to set the volume of the magnetic core to have the inductance L and the recording/reproducing performance being optimum. In other words, even if the number of winding of the coil wire is increased, it is possible to suppress increasing of the inductance L, which results in improvement of recording/reproducing performance of the magnetic head.

In addition, according to the MIG head and the manufacturing method of the MIG head described in the present embodiment, since the nonmagnetic portion 8 is formed by filling the glass material 12, such a complicated step as hot pressing is not required. In short, a simple step of forming the groove 11 and filling the molten glass material 12 therein is enough for forming the nonmagnetic portion 8. Thus, the formation of the nonmagnetic portion 8 can be added as a part of conventional magnetic head manufacturing steps. This does not largely reduce production efficiency and practical application of the MIG head can be realized in a short period of time. In addition, it is extremely preferable in reducing production cost. Besides, since the position and the shape of the nonmagnetic portion 8 is set in accordance with the formation of the groove 11, the formation of the nonmagnetic portion 8 has flexibility in accordance with easiness of the formation of the groove 11. In other words, it is extremely easy to have an appropriate position and an appropriate shape of the nonmagnetic portion 8. It is not necessary to worry about warps of the bonded blocks due to difference in thermal expansion coefficient.

As a result, the MIG head obtained in accordance with the present embodiment sufficiently realizes excellent head performance in comparison with a conventional MIG head (see FIG. 9). In specific, the MIG head according to the present embodiment shows improvement of approximately 1 dB to 1.5 dB in recording/reproducing output (frequency bandwidth to 20 MHz), compared to the conventional MIG head. In addition, the optimum recording current decreases about 10%. Furthermore, although a part in the slide contact noise (frequency bandwidth to 20 MHz) where a peak is noticeable (that is, where a wave is projected) is usually 0 to 5.0 dB, the MIG head of the present embodiment realizes the value to be reduced to substantially zero.

Figure 3:
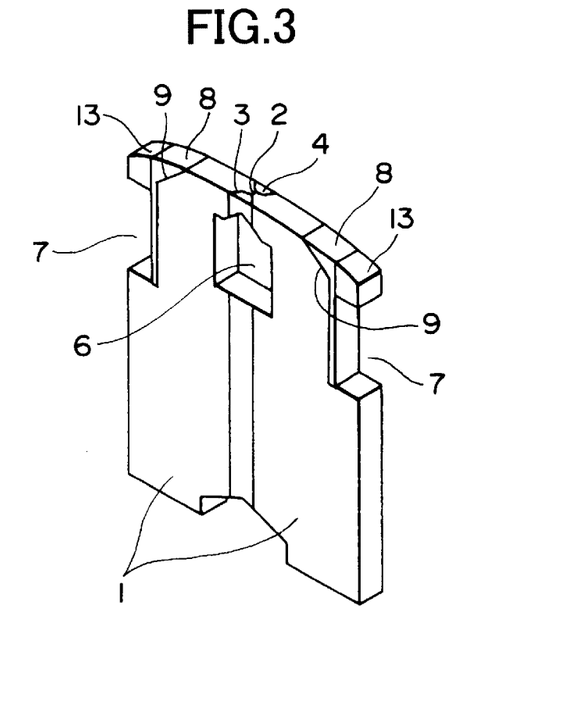
FIG. 3 is a schematic perspective view showing another example of the magnetic head according to the present invention.

In the present embodiment, a case where the nonmagnetic portion 8 extends to an end of the slide contact plane 5 has been explained. However, the present invention is not limited to the case. In other words, if the nonmagnetic portion 8 is provided at an end portion outer than the end face of the magnetic core halves 1 exposed on the slide contact plane 5, there may be provided a magnetic material 13 homogeneous with the magnetic core halves 1 at a further outer position than the nonmagnetic portion 8, as shown in FIG. 3, for example. Such an arrangement of the nonmagnetic portion 8 can be available by forming the groove 11 at a position different from that of the present case. Even in the case where the magnetic material 13 is provided at the outer edge of the slide contact plane 5, since the magnetic material is separated from each of the magnetic core halves 1 by the nonmagnetic portion 8 in terms of a magnetic circuit, volume of the magnetic core can be reduced and head performance thereof can be improved as in the case of the present embodiment.

Figure 4:
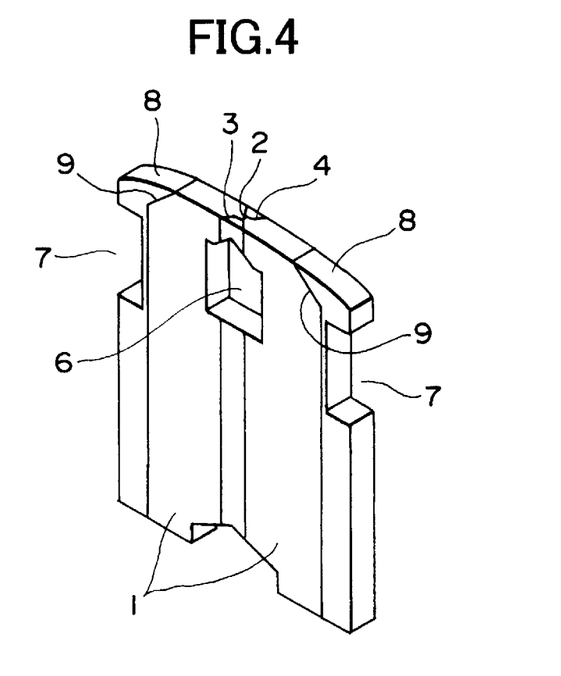
FIG. 4 is a schematic perspective view showing still another example of the magnetic head according to the present invention.
Figure 5:
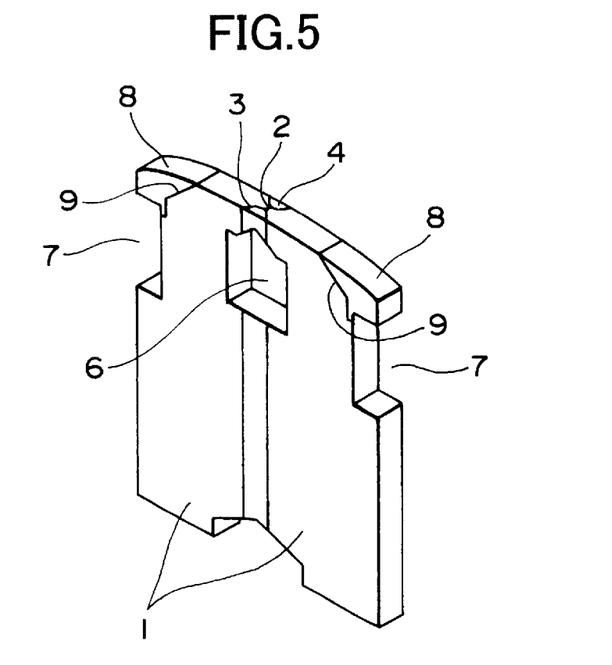
FIG. 5 is a schematic perspective view showing further another example of the magnetic head according to the present invention.

In the present embodiment, the case where the depth of the nonmagnetic portion 8 in the direction substantially orthogonal to the slide contact plane 5 extends to the bottom end of the coil guide notch 7 has been explained. However, the present invention is not limited to the case. For example, there may be a case where the nonmagnetic portion 8 extends to a position lower than the bottom end of the coil guide notch 7 as shown in FIG. 4 and a case where the nonmagnetic portion 8 extends only to the vicinity of an upper end of the coil guide notch 7. In these cases, the volume of the magnetic core can be reduced and the head performance can be improved as in the case of the present embodiment.

However, if the depth of the nonmagnetic portion 8 extends at least to the bottom end of the coil guide notch 7, the nonmagnetic portion 8 functions as a guard material for reducing leak defectiveness due to damage of a coil wire in a step of winding the coil wire (so-called winding step). Herein, the leak defectiveness means that a coating of a coil wire is damaged and a copper wire constituting the coil wire and a magnetic core come in contact, namely, it means a factor obstructive to improvement of head performance. Such leak defectiveness is mainly generated when the coating of the coil wire is damaged by interfering with an edge of a portion without the coil wire of the magnetic core in the winding step. However, if the nonmagnetic portion 8 functions as the guard material, the nonmagnetic portion 8 insulates the coil wire from the magnetic core even if the coating of the coil wire is damaged, and thus, it is possible to suppress generation of the leak defectiveness as much as possible.

Accordingly, it is most preferable that the depth of the nonmagnetic portion 8 extends to the bottom end of the coil guide notch 7 for improvement of the head performance. This is because the portion in the vicinity of the coil guide notch 7, that is, a portion from around where the coil wire is wound to the slide contact plane 5 is a portion having influence on recording/reproducing performance in particular, and a portion lower than that does not contribute to significant improvement of the performance even if the volume of the magnetic core is adjusted.

Figure 7:
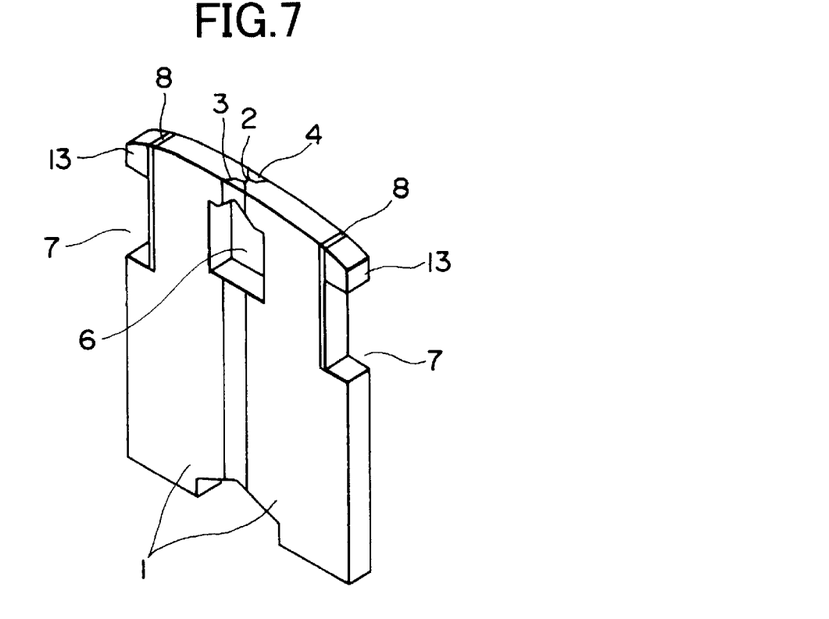
FIG. 7 is a schematic perspective view showing another example of the magnetic head according to the present invention.
Figure 8:
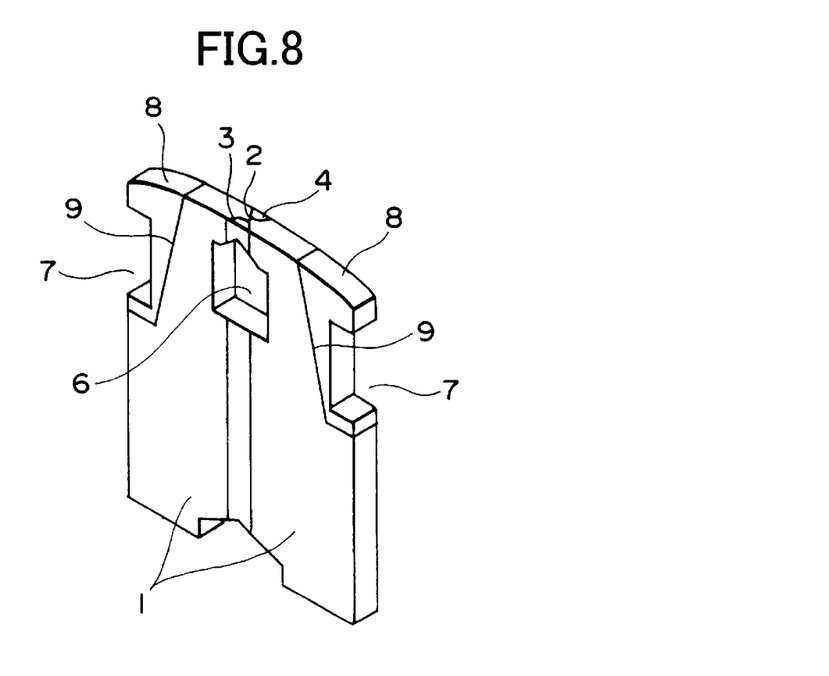
FIG. 8 is a schematic perspective view showing further another example of the magnetic head according to the present invention.

In addition, in the present embodiment, the case where the nonmagnetic portion 8 has the slope 9 formed by chamfering process. However, the present invention is not limited to the case. For example, in a case where a boundary face of the nonmagnetic portion 8 and the magnetic core half 1 has a substantially right angle relative to the slide contact plane 5 as shown in FIG. 6 or FIG. 7, it is possible to reduce the volume of the magnetic core and to improve the head performance as in the case of the present embodiment.

However, as described in the present embodiment, since, if the nonmagnetic portion 8 has the slope 9, the angle between the slope 9 and the slide contact plane 5 is non-right angle, there scarcely occurs a crack or dropout of the glass material or the ferrite material at the boundary portion of the nonmagnetic portion 8 and the magnetic core half 1 when the slide contact plane 5 is in slide-contact with a magnetic tape. In other words, damage of the slide contact plane 5 due to the crack or dropout of the glass material or the ferrite material is scarcely occurred, which is preferable for keeping excellent head performance for a long time. This also applies to a case of a slope 9 having an angle other than 45° formed by chamfering even if the angle between the slope 9 and the slide contact plane 5 is not right angle.

The glass material filled to have the nonmagnetic portion 8 in the MIG head of the present embodiment has the same composition as the low melting glass 4 filled in the track width regulating grooves. This is for minimizing influence (change) on abrasion characteristics of the MIG head at the slide contact plane 5 in consideration of the slide contact with the magnetic tape by having the nonmagnetic portion 8 made of a glass material having equivalent composition to the low melting glass 4 and for removing a burden of controlling the glass material during the manufacturing process.

Furthermore, in the present embodiment, the case where the side surface of the groove 11 into which the glass material 12 is filled is finished to have a surface roughness Ra of 50 nm or less at a step of forming the nonmagnetic portion 8 has been described. This is for preventing defective holes caused by bubbles or the like from being generated in the glass portion to be the slide contact plane 5. Precisely, there is less possibility of bubbles generated by reaction of the glass material and a foreign substance and there is less defectiveness of having defective holes generated due to the bubbles moving toward the vicinity of the slide contact plane 5 is caused even if the glass material 12 is filled into the groove 11 after washing the side planes of the groove 11 because the foreign substance is hard to be left when the side surface has such a surface roughness of 50 nm or less. However, the present invention is not limited to the case and a protective film formed on a surface of a portion where the glass material 12 is filled may be used for suppressing the generation of the defective holes.

In addition, in the present embodiment, the case where the present invention is applied to the MIG head has been described. However, the present invention may be applied to any other magnetic head in the similar way as far as the head is a bulk-type magnetic head formed by abutting a pair of magnetic core halves on each other and having a winding opening for winding a coil wire.

Although the invention has been described in its preferred form with a certain degree of particularity, obviously many changes and variations are possible therein. It is therefore to be understood that the present invention may be practiced otherwise than as specifically described herein without departing from the scope and the sprit thereof.

What is claimed is:

1. A magnetic head comprising:
   a pair of magnetic core halves fitted to abut each other;
   a nonmagnetic gap formed between said magnetic core halves;
   a slide contact plane for slide contact with a magnetic recording medium;
   a pair of nonmagnetic portions at both ends of said slide contact plane; and
   a ferromagnetic thin film layer on said magnetic core halves between said nonmagnetic gap and each of said nonmagnetic portions;
   wherein,
      said magnetic core halves comprise a ferrite material;
      said nonmagnetic portions comprise a glass material; and
      said nonmagnetic portions are on the slide contact plane which extends beyond the magnetic core halves.

2. The magnetic head according to claim 1, wherein the nonmagnetic portion extends to an edge of the slide contact plane.

3. The magnetic head according to claim 1, wherein a magnetic material homogeneous with the magnetic core halves extends beyond the nonmagnetic portions.

4. A magnetic head comprising:
   a pair of magnetic core halves fitted to abut each other;
   a nonmagnetic gap formed between said magnetic core halves;
   a slide contact plane for slide contact with a magnetic recording medium;
   a pair of nonmagnetic portions at both ends of said slide contact plane; and
   a ferromagnetic thin film layer on said magnetic core halves between said nonmagnetic gap and each of said nonmagnetic portions;
   wherein,
      said magnetic core halves comprise a ferrite material;
      said nonmagnetic portions comprise a glass material; and
      said nonmagnetic portions are on the slide contact plane which extends beyond the magnetic core halves;
      further comprising a coil winding portion on which a coil wire is wound in a direction substantially parallel to the slide contact plane, and
      wherein the nonmagnetic portion has a depth from the slide contact plane in a direction substantially orthogonal to the slide contact plane and extending to the coil winding portion.

5. The magnetic head according to any one of claims 1 to 4, wherein the nonmagnetic portion has a slope non-parallel to the nonmagnetic gap formed between the magnetic core halves.

6. The magnetic head according to any one of claims 1, 2, or 4 wherein the glass material filled in the nonmagnetic portion has a composition same as a glass material used for bonding the pair of magnetic core halves and for a track width regulating groove for regulating a track width of the nonmagnetic gap.

7. A magnetic head comprising:
   a pair of magnetic core halves fitted to abut each other;
   a nonmagnetic gap formed between said magnetic core halves;
   a slide contact plane for slide contact with a magnetic recording medium;
   a pair of nonmagnetic portions at both ends of said slide contact plane; and
   a ferromagnetic thin film layer on said magnetic core halves between said nonmagnetic gap and each of said nonmagnetic portions;
   wherein,
      said magnetic core halves comprise a ferrite material;
      said nonmagnetic portions comprise a glass material;
      said nonmagnetic portions are on the slide contact plane which extends beyond the magnetic core halves; and
      said nonmagnetic portions extends to an edge of the slide contact plane;
      further comprising a coil winding portion on which a coil wire is wound in a direction substantially parallel to the slide contact plane, and
      wherein the nonmagnetic portion has a depth from the slide contact plane in a direction substantially orthogonal to the slide contact plane and extending to the coil winding portion.

8. A magnetic head comprising:
   a pair of magnetic core halves fitted to abut each other;
   a nonmagnetic gap formed between said magnetic core halves;
   a slide contact plane for slide contact with a magnetic recording medium;
   a pair of nonmagnetic portions at both ends of said slide contact plane; and
   a ferromagnetic thin film layer on said magnetic core halves between said nonmagnetic gap and each of said nonmagnetic portions;
   wherein,
      said magnetic core halves comprise a ferrite material;
      a glass material forms said nonmagnetic portions;
      said nonmagnetic portions are on the slide contact plane which extends beyond the magnetic core halves;
      said nonmagnetic portion extends to an edge of the slide contact plane; and
      a magnetic material homogeneous with the magnetic core halves extends beyond the nonmagnetic portions;
      further comprising a coil winding portion on which a coil wire is wound in a direction substantially parallel to the slide contact plane;
      wherein the nonmagnetic portion has a depth from the slide contact plane in a direction substantially orthogonal to the slide contact plane and extending to the coil winding portion.

9. The magnetic head according to any one of claims 1, 2, 4, 7, and 8, wherein the nonmagnetic portion has a slope non-parallel to the nonmagnetic gap formed between the magnetic core halves.

* * * * *